(12) United States Patent
Röhrig et al.

(10) Patent No.: US 11,486,529 B2
(45) Date of Patent: Nov. 1, 2022

(54) CONNECTION ASSEMBLY, IN PARTICULAR FOR CONDUCTING AQUEOUS UREA SOLUTIONS

(71) Applicant: VOSS AUTOMOTIVE GMBH, Wipperfürth (DE)

(72) Inventors: Lukas Röhrig, Marienheide (DE); Alexander Oberdörfer, Radevormwaid (DE); Eugen Heinrichs, Bergneustadt (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 14 days.

(21) Appl. No.: 17/255,426

(22) PCT Filed: Jun. 14, 2019

(86) PCT No.: PCT/EP2019/065652
§ 371 (c)(1),
(2) Date: Dec. 22, 2020

(87) PCT Pub. No.: WO2020/011484
PCT Pub. Date: Jan. 16, 2020

(65) Prior Publication Data
US 2021/0140576 A1    May 13, 2021

(30) Foreign Application Priority Data
Jul. 13, 2018   (DE) ..................... 10 2018 117 056.4

(51) Int. Cl.
*H01R 13/639*   (2006.01)
*F16L 53/37*    (2018.01)
*H01R 13/00*    (2006.01)

(52) U.S. Cl.
CPC ............ *F16L 53/37* (2018.01); *H01R 13/005* (2013.01); *H01R 13/639* (2013.01)

(58) Field of Classification Search
CPC ...... F16L 53/37; H01R 13/005; H01R 13/639
See application file for complete search history.

(56) References Cited

U.S. PATENT DOCUMENTS

| | | | |
|---|---|---|---|
| 7,991,273 B2 * | 8/2011 | Sonderegger | ........... F16L 53/38 392/465 |
| 2010/0064670 A1 | 3/2010 | Starck et al. | |
| 2018/0252345 A1 | 9/2018 | Hackel et al. | |

FOREIGN PATENT DOCUMENTS

| | | |
|---|---|---|
| CA | 2008633 A1 | 7/1990 |
| DE | 8900869 U1 | 3/1989 |

(Continued)

*Primary Examiner* — Tho D Ta
(74) *Attorney, Agent, or Firm* — Eric J. Sosenko; Jonathan P. O'Brien; Honigman LLP

(57) ABSTRACT

A connector arrangement for conducting liquid urea solutions. The connector arrangement includes a distributor, with at least three connecting elements, and a connecting component, located between the connecting elements, with inner channels running within the connecting component. Three individual lines having connecting means are connected to the connecting elements of the distributor by the connecting means, and a housing surrounds the distributor and at least a part of the individual line. The distributor is disposed in the housing together with end sections of the connected individual lines. A channel line inner diameter of the inner channels and a total length of the inner channels and a wall thickness of the distributor in the connecting component are dimensioned such that ice pressure on the distributor, which occurs as a result of the freezing of a liquid within the distributor, does not result in any destruction.

28 Claims, 4 Drawing Sheets

(56) References Cited

FOREIGN PATENT DOCUMENTS

| | | |
|---|---|---|
| DE | 102006048500 A1 | 4/2008 |
| DE | 202007009337 U1 | 11/2008 |
| DE | 202017101274 U1 | 3/2017 |
| DE | 202017104003 U1 | 7/2017 |
| DE | 202016107433 U1 | 3/2018 |
| DE | 102016220594 A1 | 4/2018 |
| EP | 3431855 A1 | 1/2019 |
| KR | 20080030618 A  * | 4/2008 |
| WO | 2006136306 A1 | 12/2006 |
| WO | 2019008489 A1 | 1/2019 |

* cited by examiner

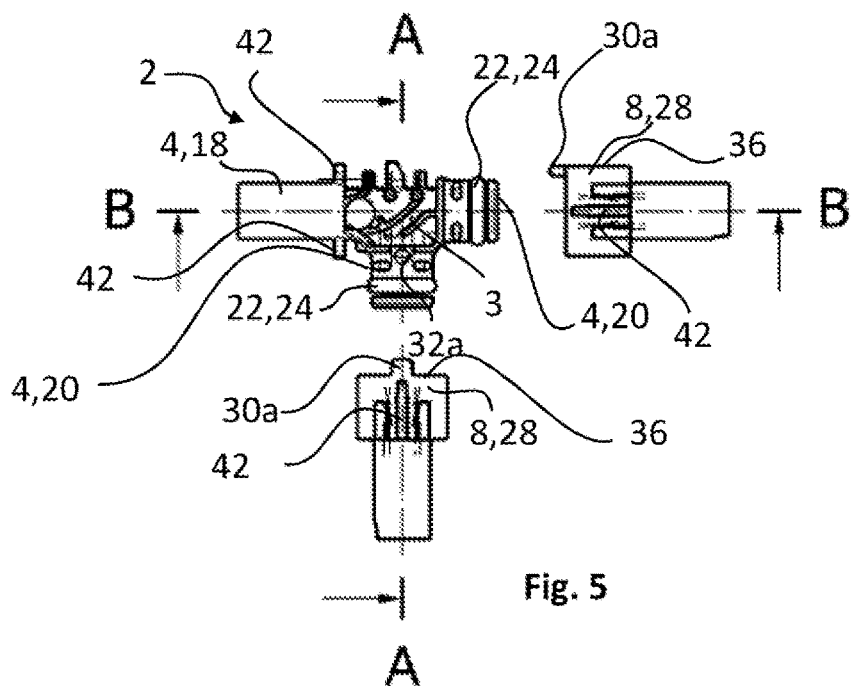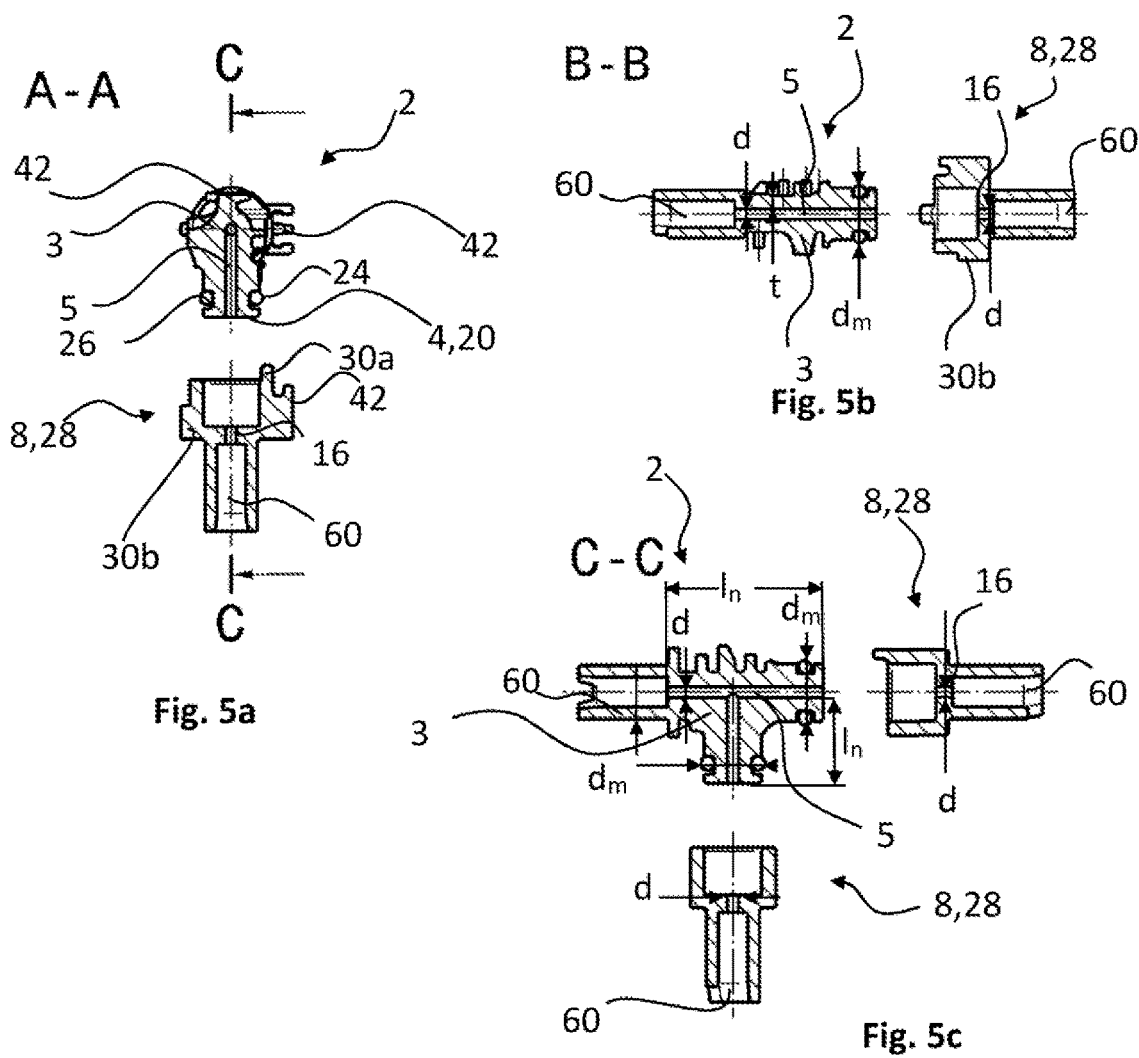

CONNECTION ASSEMBLY, IN PARTICULAR FOR CONDUCTING AQUEOUS UREA SOLUTIONS

BACKGROUND

The invention relates to a connector arrangement in accordance with the preamble of claim 1.

A connector arrangement of this type is known from DE 20 2017 101 274 U1.

In the case of connector arrangements for conducting liquid media, the problem exists that the liquid medium freezes and expands in volume at low temperatures. Liquid media of this type are, for example, liquid urea solutions which are known to be used in so-called SCR processes (selective catalytic reduction) in motor vehicles to reduce the nitrogen content of exhaust gases. Due to the volume expansion contingent upon freezing and the accompanying ice pressure, the distributors and/or liquid lines can be damaged or even completely destroyed. In principle, it is a known practice to heat these types of connectors and/or the attached liquid lines. Nonetheless, it is desirable to have additional help in the event that the solutions do freeze.

In the case of prior art connector arrangements, the retaining means is supported via a spring element on a fastening element, which is disposed within the housing and which is configured as a transverse wall in one leg of the housing, wherein the retaining means can be moved in the direction of the fastening element against the restoring force of the spring element. In the case of this known connector arrangement, the assembly and/or manufacture requires a relatively large amount of work, as the various spring elements must be placed into the housing together with the liquid lines, on each liquid line respectively, before the installation of the connecting body, and must be held under tension with the inserted liquid lines during the installation of the connecting body, so that they can be supported on the fastening element within the housing in the assembled state. Additionally, the heating elements of the liquid lines must each be passed via a central opening through the fastening element and on the spring element. Additionally, the liquid lines can be moved with the retaining element against the connecting body, and the connecting body can be moved against the housing within the housing between the fastening elements, or rather, the spring elements. Due to this, undesired vibrations can occur in the connector arrangement.

SUMMARY

The object of the invention is to produce a connector arrangement of the type specified in the introduction, in which the problems and disadvantages described above can be effectively avoided, and which is designed in such a way as to withstand—without additional compensation means—the ice pressure created by the freezing of a liquid flowing therein.

The object is achieved according to the invention by the features of claim 1.

The invention is based on the ice pressure within the inner channels being so low that destruction of the connecting component is avoided. In the case of SCR liquids, the volume expansion upon freezing is approximately 10%, from which the respective ice pressure can be calculated depending upon the dimensions of the inner channels.

It is advantageous that the connecting elements are cylindrical sleeves, into which individual lines are respectively inserted, wherein the inner channels of the connecting component extend all the way to the transitions from the connecting component to the cylindrical sleeves. Accordingly, a favorable embodiment consists in that the total length of the inner channels of the connecting component divided by the channel line inner diameter of the connecting component of the distributor is less than/equal to 9, according to the following formula:

$$\text{Total length of inner channels} \div \text{Channel line inner diameter} \leq 9$$

According to a further embodiment, it is advantageous that one connecting element is a cylindrical sleeve, into which the individual line is inserted and two connecting elements are plug connections, which are each respectively inserted into insertion sleeves of the two other individual lines, wherein the inner channels of the connecting component extend all the way to the connection-side end of the plug connections and end at the transition of the connecting component to the cylindrical sleeve. Such an embodiment constitutes a favorable design in that, when the total length of the inner channels of the connecting component is designed according to the following measurements:

$$\text{Total length of inner channels} \div \text{Channel line inner diameter} \leq 23$$

A further favorable embodiment is obtained when the connecting component of the distributor exhibits a channel line inner diameter which is less than or equal to a minimal connection line inner diameter of an attached individual line.

In particular it is favorable when the plug connections of the distributor exhibit sealing areas, and circumferential sealing means, in particular O-rings, are disposed in the sealing areas, which exhibit a sealing means outer diameter. It is preferable that the diameter ratio at a connection point between plug connection and an individual line is designed according to the following formula:

$$\text{Sealing means outer diameter} \div \text{Channel line inner diameter} \leq 6$$

In particular, the plug connections of the distributor have a wall thickness which circumferentially corresponds at least to the smallest channel line inner diameter.

Accordingly, a favorable embodiment is obtained, for example, when the connection line inner diameter of a media-conducting tube is 2 mm with a wall thickness of 1 mm, and the channel line inner diameter of the connecting component is 1.5 mm. A favorable relationship between wall thickness and channel line inner diameter is thereby achieved, which offers freeze protection to the line.

Additionally, the insertion sleeves can contain an orifice which is adapted to the reduced channel line inner diameter of the connecting piece. The orifice functions favorably as a flow reducer, so that in cases of larger inner line diameters any ice chunks which form do not press against the front face of the distributor and thus potentially force the connection apart.

The media-conducting tube favorably consists of non-filled PA and can thus absorb the ice pressure without problems. Because the connecting component according to the invention exhibits only a small internal volume and a large wall thickness in relation thereto, the connector arrangement is protected from damage caused by ice pressure.

The distributor and/or the insertion sleeves can favorably be heated electrically. For this purpose, the distributor can be wrapped circumferentially with at least one heating coil. The insertion sleeves can be provided at least on one side with at least one heating coil. In this case, the media-conducting tubes are also electrically heated, and a heating coil affixed to the media-conducting tube in particular continues onward to the distributor and/or to the insertion sleeves.

It is favorable that the distributor and the insertion sleeves exhibit integrated guides and holders for the respective heating coils. As the heating coils are located in the connection area of the insertion sleeves, uniform heating of the combination of distributor/insertion sleeve and plug connection/insertion sleeves can be achieved. It is furthermore advantageous that the housing exhibits pocket-like indentations for receiving the distributor with its associated guides and holders.

It is preferable that distributors and insertion sleeves also contain means for mutual rotational locking, which protrude like tabs over the insertion sleeves and engage in corresponding grooves on the distributor. Preferably the tabs for rotational locking are disposed on both insertion sleeves offset at an angle, for example 90°, on the outer wall of the insertion sleeves. Thus it can be ensured that the insertion sleeves along with their attached lines can only be mounted in the plug connections assigned to them (Poka Yoke). In the event of faulty assembly, the housing can no longer be fully closed, because then the retaining means for the heating coils rest in housing areas which are not intended to receive them.

In particular, the electrical heating coils within the housing are connected to each other by electrical plug connections, and are separated from the liquid-conducting connections. For this purpose, the housing contains receiving chambers which receive the electrical plug connectors. These receiving chambers preferably contain mounting means, which fasten the electrical plug connectors.

The housing preferably consists of an upper housing half and a lower housing half, wherein the housing halves can be separated and connected again via snap-in means.

Additional favorable embodiments of the invention are contained in the subordinate claims.

BRIEF DESCRIPTION OF THE DRAWINGS

The invention is described in greater detail in the following figure descriptions.

FIG. 5 is a top view of a distributor according to the invention in a disconnected state, with the associated connection means.

FIG. 5a is a sectional view along line A-A of the distributor according to FIG. 5 of the invention.

FIG. 5b is a sectional view along line B-B of the distributor according to FIG. 5 of the invention.

FIG. 5c is a sectional view along line C-C of the distributor according to FIG. 5a of the invention.

In the various figures of the illustration materials, the same components are always denoted by the same reference numerals.

DETAILED DESCRIPTION

In the following discussion, the distributor 2 according to the invention is T-shaped in FIGS. 1 to 7. It also falls within the scope of the invention if the distributor is configured to be, for example, Y-shaped.

Figure 1:
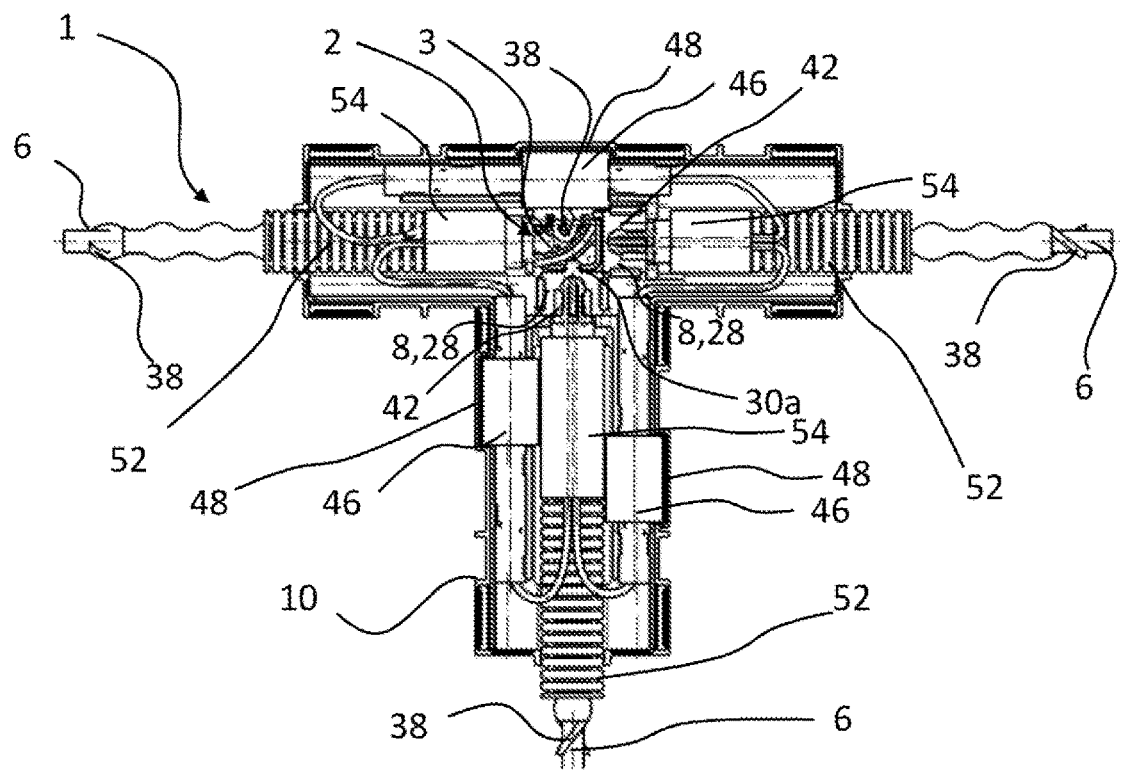
FIG. 1 is a top view of a connector arrangement according to the invention with open housing.

FIG. 1 shows a connector arrangement 1 according to the invention, in particular for conducting liquid urea solutions. As can be seen in FIGS. 1 to 6, the connector arrangement 1 according to the invention exhibits a distributor 2 with three connecting elements 4, 18, 20, and a connecting component 3 lying between the connecting elements 4, 18, 20. A media-conducting individual line 6 is connected to each of the three connecting elements 4, 18, 20 respectively. The three individual lines 6 have connecting means 8, 28 on their ends for this purpose. The connecting means 8, 28 are depicted as detached from the individual lines 6 in FIG. 4. Thus the individual lines 6 are connected to the connecting elements 4, 18, 20 of the distributor 2 by means of the connecting means 8, 28, as depicted in FIG. 1. A housing 10 surrounds the distributor 2 and a part of the individual lines 6 in their connection area. The housing 10 in particular consists of two housing halves 10a, 10b, see FIG. 2, and the distributor 2 is inserted along with the attached media-conducting individual lines 6 into one of the housing halves 10b in the open state of the housing 10.

Figure 6:
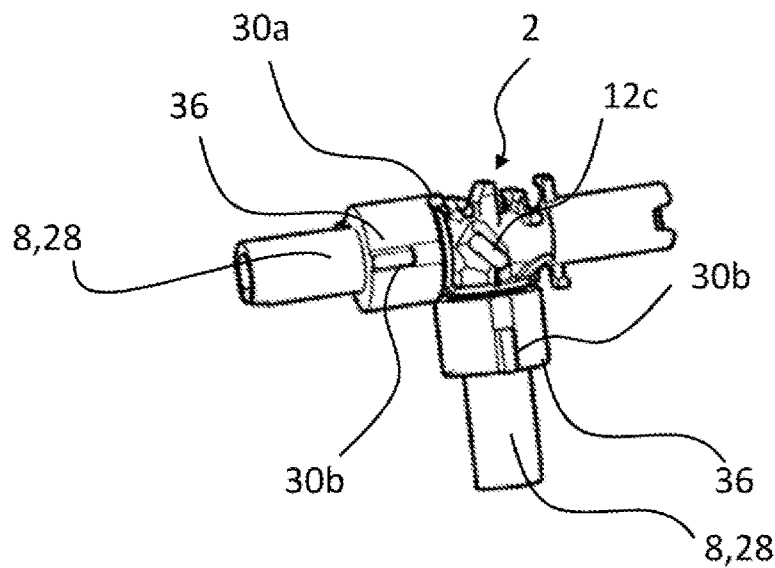
FIG. 6 is a frontal view of the side of a distributor according to the invention which is turned toward the direction of insertion according to FIG. 4, in a disconnected state with the associated connection means.

FIGS. 5 to 6 depict the distributor 2 according to the invention and the connecting elements 4, 18, 20 according to the invention, as well as the connecting means 8, 28 according to the invention, wherein the connecting elements 4, 18, 20 and the connecting means 8, 28 are not connected to the individual lines 6 in these illustrations. In particular, the sectional views according to FIGS. 5a to 5c depict the connecting component 3 according to the invention. FIGS. 5b and 5c show inner channels 5 of the distributor 2, a channel line inner diameter d of the inner channels 5, a total length $l_g$ of the inner channels 5, and a wall thickness t of the connecting component 3. In this regard the channel line inner diameter d of the inner channels 5, the total length $l_g$ of the inner channels 5, and the wall thickness t of the connecting component 3 are dimensioned such that any ice pressure caused by the freezing of a liquid within the distributor 2 does not cause the destruction of the distributor 2. In particular, the total length $l_g$ of the inner channels 5 of the connecting component 3 is determined from the sum of the individual branching channel sections 111, as is depicted in FIG. 5c.

As depicted in FIGS. 5 to 5c, one connecting element 4 is in particular a cylindrical sleeve 18, into which an individual line 5 is inserted, and the two other connecting elements 4 are plug connections 20, which is/are inserted into insertion sleeves 28, wherein these insertion sleeves 28 are affixed onto the media-conducting individual lines 6.

As is depicted for example in FIG. 5c, the insertion sleeves 28 have a sleeve-like insertion section 60 on the side which faces away from the plug connection 20 for the insertion of the individual lines 6. An insertion section 60 such as this also features the cylindrical sleeve 18 of the distributor 2, as depicted in FIG. 5c.

It is advantageous that the individual lines 6 in particular are inserted into the insertion sections 60 and connected to the insertion section 60. In particular, an individual line 6 is connected to the cylindrical sleeve 18 of the distributor 2 in a materially-bonded manner and/or the insertion sleeves 28 are connected to the individual lines 6 in a materially-bonded manner.

Preferably an individual line 6 is connected to the cylindrical sleeve 18 by laser welding and/or the individual lines 6 are connected to the insertion sleeves 28 by laser welding. For this purpose, the cylindrical sleeve 18 and/or the insertion sleeves 28 of the individual lines 6 can be made partially from laser-transparent plastic.

The fully connected state of the connector arrangement 1 is depicted in FIG. 1. In particular, the inner channels 5 of the connecting component 3 extend all the way to the connection-side end of the plug connections 20 and end at the transition of the connecting component 3 to the cylindrical sleeve 18.

Figure 2:
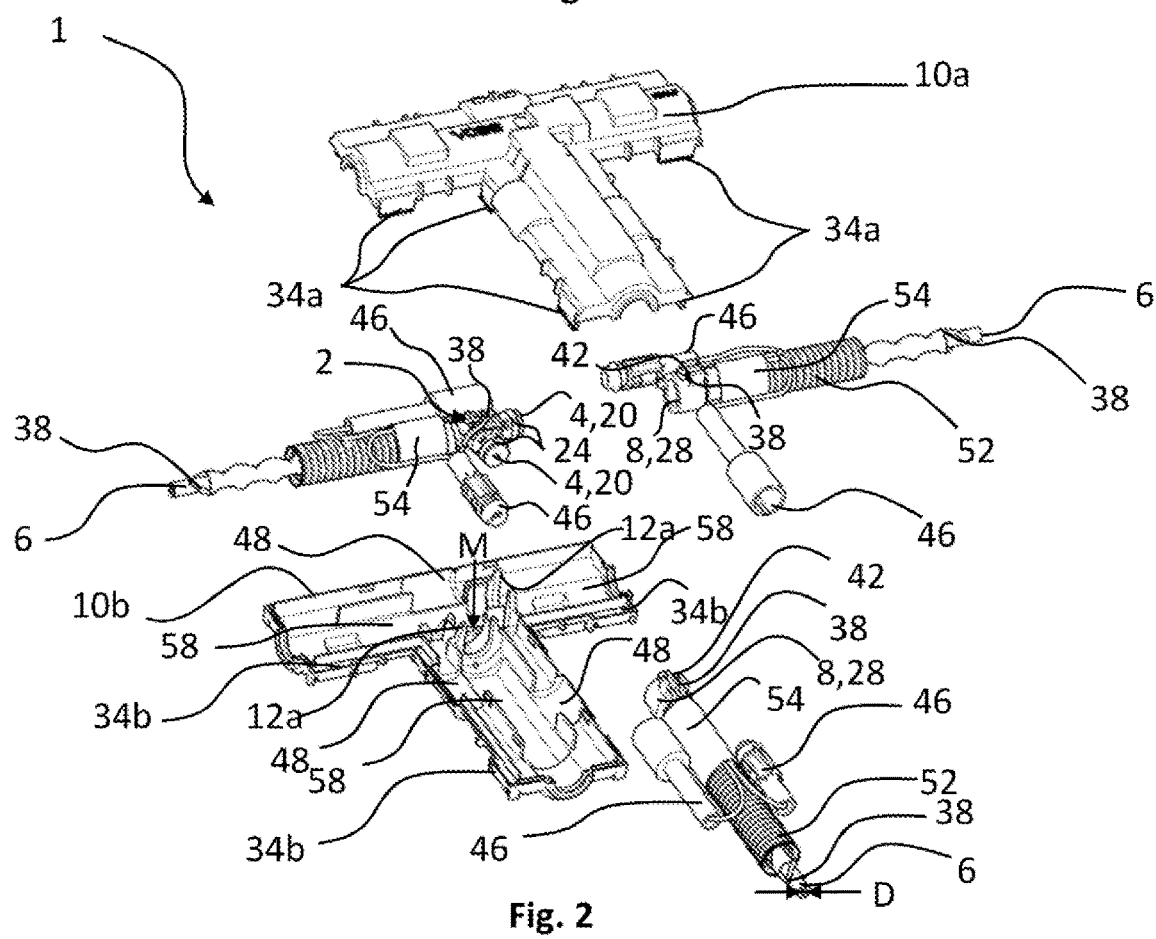
FIG. 2 is an exploded view of a connector arrangement according to the invention in a disconnected state of the distributor arrangement.

It is especially advantageous that the connecting component 3 exhibits a channel line inner diameter d which is less than or equal to a minimal connection line inner diameter D, depicted in FIG. 2, of a connected individual line 6.

Furthermore, it is preferable that the total length $l_g$ of the inner channels 5, which is determined from the inner channel sections $l_n$, when divided by the channel line inner diameter d of the connecting component 3 of the distributor 2 is less than or equal to 23. That is:

Total length ($l_g$) of inner channels (5)÷Channel line inner diameter (d)≤23

According to a not-depicted favorable embodiment, in which the connecting elements 4 of the distributor 2 are exclusively three cylindrical sleeves 18, into each of which an individual line 6 is respectively inserted, the inner channels 5 of the connecting component 3 extend all the way to the transitions from the connecting component 3 to the cylindrical sleeves 18. In this embodiment it is advantageous that the total length $l_g$ of the inner channels 5 of the connecting component 3 divided y the channel line inner diameter d of the connecting component 3 of the distributor 2 be less than or equal to 9, according to the following formula:

Total length (4) of inner channels (5)÷Channel line inner diameter (d)≤9

As depicted in FIG. 5b, the distributor 2 exhibits a wall thickness t. In particular, the wall thickness t of the distributor 2 corresponds in circumference at least to the channel line inner diameter d.

It is preferable that the plug connections 20 have sealing areas 22, as depicted in FIGS. 5 to 5c. The sealing areas 22 thereby each exhibit circumferential sealing means 24, in particular an O-ring. In particular, the O-rings have a sealing means outer diameter $d_m$. The diameter ratio at a connection point between the insertion sleeve 28 and plug connection 20 is less than or equal to 6, corresponding to the following formula.

Sealing means outer diameter ($d_m$)÷Channel line inner diameter (d)≤6

In particular, the sealing area 22 exhibits a sealing groove 26 for the sealing means 24, as is depicted in FIG. 5a for example.

According to a favorable embodiment, and as depicted in FIGS. 5a to 5c, the insertion sleeves 28 of the individual lines 6 can contain an orifice 16, which reduces the connection line inner diameter D down to the channel line inner diameter d of the connecting component 3 of the distributor 2. Furthermore, such an orifice 16 can form a stop for the plug connection 20 of the distributor 2 and a stop for the media-conducting individual lines 6.

Figure 7:
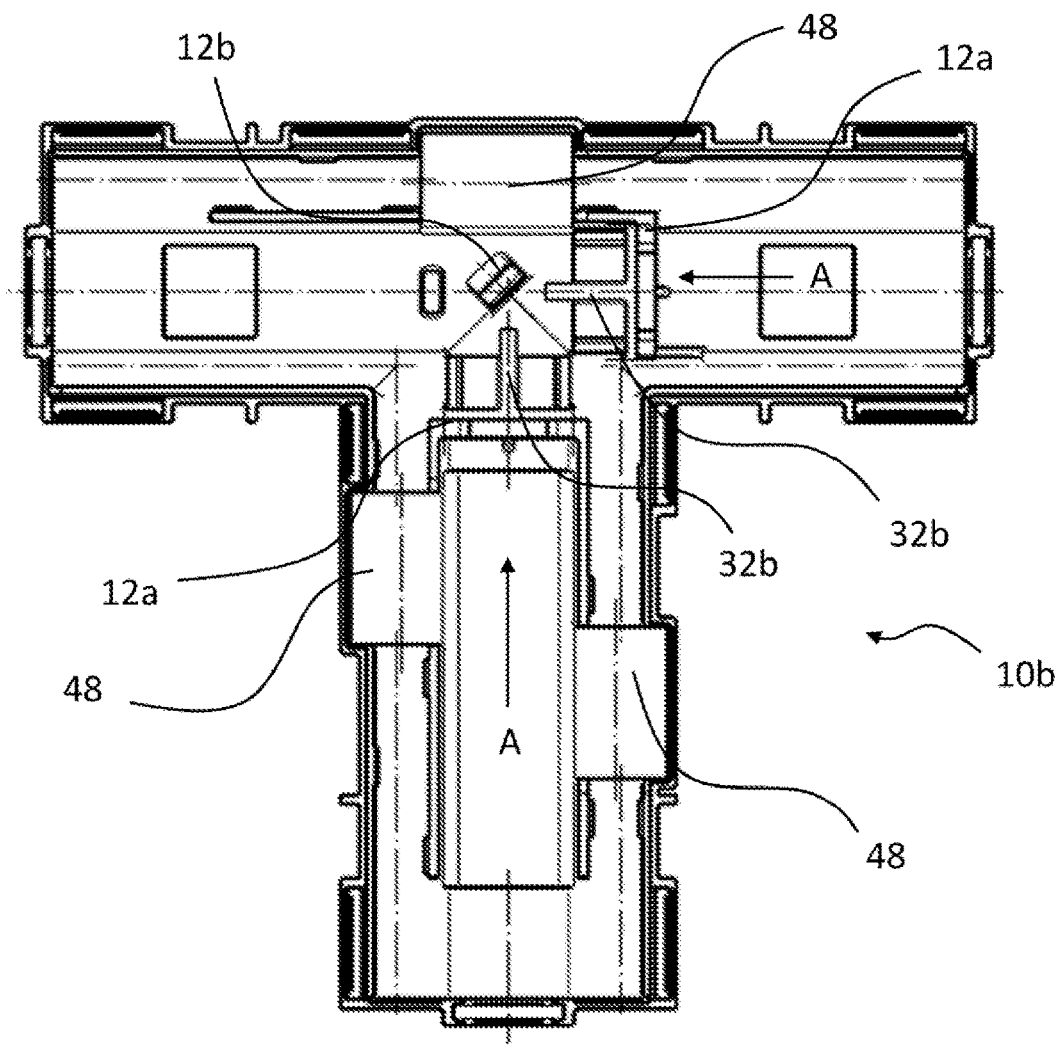
FIG. 7 is a view of a lower housing half of a two-part housing according to the invention.

According to FIGS. 5 to 6, the insertion sleeves 28 preferably have tab-like rotational locks 30a and guide webs 30b protruding on an outer wall 36, which engage with corresponding grooves 32a on the distributor 2 and guide grooves 32b on the housing 10, depicted in FIG. 7. The tab-like rotational locks 30a can be disposed at an offset particularly at an angle of 90° on the outer wall 36 of the insertion sleeves 28, wherein the corresponding grooves 32a are also disposed at an offset of 90° on the distributor 2, and the guide webs 30b on the outer wall 36 and the guide grooves 32b in the housing 10 are always oriented in the direction of an insertion direction M—depicted in FIG. 2—and progress axially to a connecting direction A, depicted in FIGS. 3 and 7.

Figure 3:
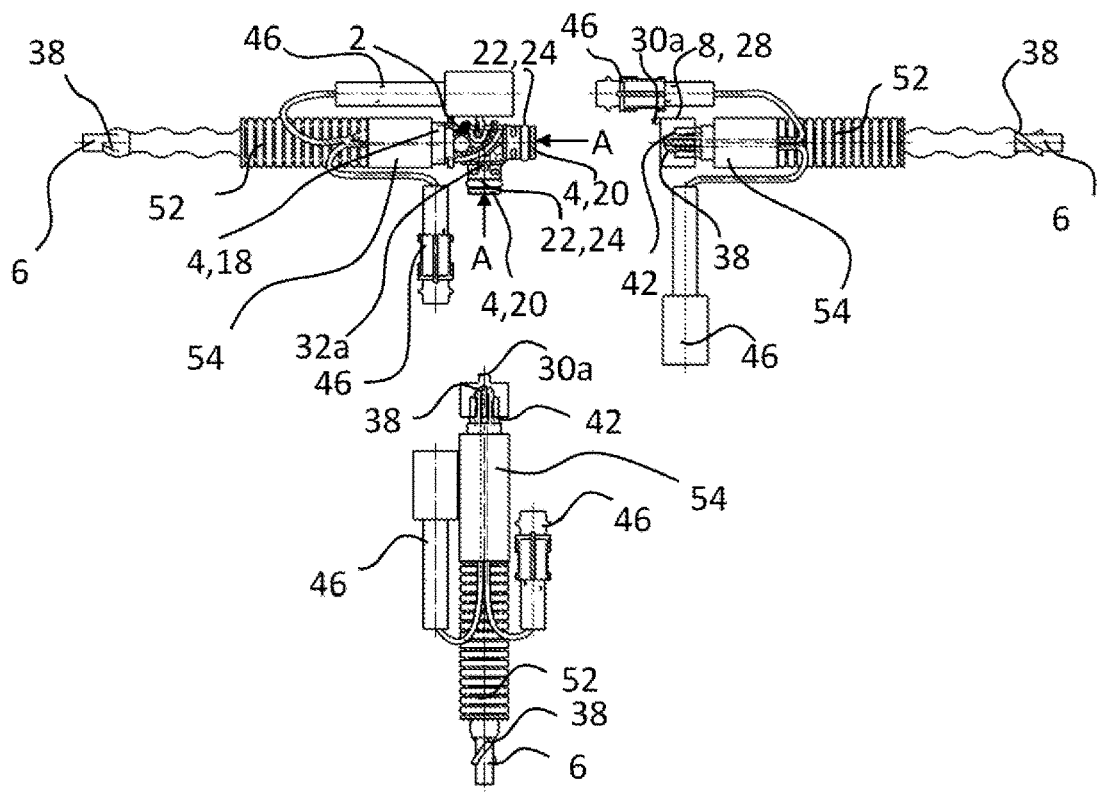
FIG. 3 is a top view of the connector arrangement according to the invention in a disconnected state without housing.

According to another embodiment, as depicted in FIGS. 1 to 3, the distributor 2 can be heated electrically. For this purpose, the distributor 2 is circumferentially wound with a heating coil 38. The insertion sleeves 28 are provided with a heating coil 38 on one side. In this case, the media-conducting individual lines 6 are also electrically heated, and a heating coil 38 affixed to the media-conducting individual line 6 in particular continues to the distributor 2 and/or to the insertion sleeves 28.

As depicted in FIG. 1, the individual lines 6 are wrapped with two heating coils 38 for this purpose, in particular running parallel to each other.

The distributor 2 and/or the insertion sleeves 28, as depicted in FIG. 2, advantageously exhibit integrated guides and holders 42 for the heating element coils 38. In particular, the housing 10 exhibits pocket-like indentations 58 for receiving the distributor 2 with its associated guides and holders 42.

Figure 4:
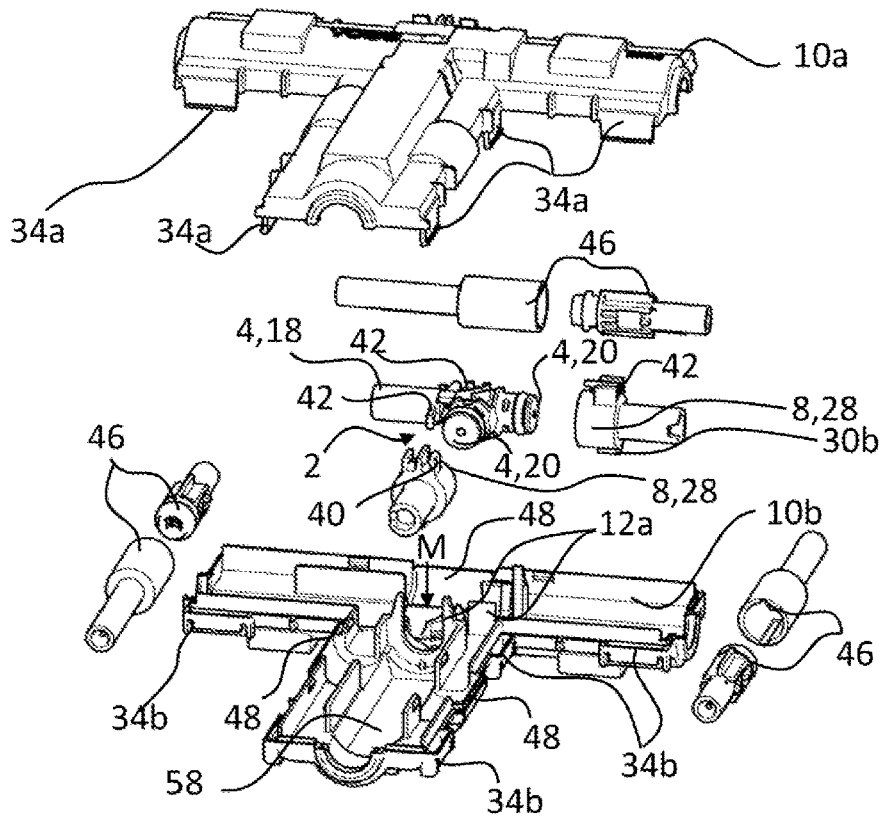
FIG. 4 is an exploded view of a connector arrangement according to FIG. 2 of the invention without electrical lines and without media-conducting lines.

FIGS. 2, 4, and 6 to 7 show that the housing 10 advantageously exhibits retaining means 12a, 12b for the distributor 2 and the connecting means 8, 28, wherein at least a part of the retaining means 12a for the connecting means 8, 28 in the housing 10 is configured in particular in a C-shape, and the connecting means 8, 28 are fastened in a snap-in manner, and a further part of the retaining means 12b for the distributor 2 is a stop tab 12b for the distributor 2, wherein the stop tab is in particular positioned at an angle of 45° to the connecting elements 4, 18, 20, and against which the distributor 2 rests with a stop tab 12c which is disposed in a corresponding manner to the stop tab 12b of the housing 10. As depicted in FIGS. 2 and 4, the C-shaped retaining means 12a are open in particular opposite the insertion direction M, so that the distributor 2 and the individual lines 6 connected to the distributor 2 can be inserted in the insertion direction M into the housing 10 and the connecting means 8, 28 are encompassed by the retaining means 12a. It is advantageous that the retaining means 12a engage behind the insertion sleeves 28 and form a stop for the insertion sleeves 28 against the connecting direction A which is marked in FIG. 3, so that the individual lines 6 with the insertion sleeves 28—when installed into the housing 10, as depicted in FIG. 1—cannot disengage from the plug connections 20 of the distributor 2. Due to the combined effect of the retaining means 12b, 12c, and the retaining means 12a with the connecting means 8, 28, as depicted in FIG. 1 the distributor 2 in its assembled state is held in a floating mount.

FIGS. 2 and 4 further show that the housing 10 is advantageously divided into an upper housing half 10a and a lower housing half 10b. In particular, the housing halves 10a, 10b have separable and reconnectable snap-in means 34a, 34b. As depicted in FIG. 3, snap-in arms 34a are disposed in particular on the upper housing half 10a, which engage in corresponding recesses 34b in the lower housing half 10b.

The individual lines 6 preferably exhibit a protective covering 52, in particular a shaft tube, which envelopes the individual lines 6 and the heating coils 38, as depicted in FIG. 3.

As depicted in FIG. 3, the heating coils 38 of the individual lines 6 are connected to each other within the housing 10 by means of electrical plug connectors 46.

In particular, the heating coils 28 of the individual lines 6 are connected to one another via the electrical plug connectors 46 independently of the liquid-conducting connections, as depicted in FIG. 1, and placed into the housing 10.

For this purpose, the housing 10 exhibits in particular receiving chambers 48 for the electrical plug connectors 46, so that the electrical plug connectors 46 are enclosed by the receiving chamber 48 of the housing 10. In particular, the receiving chamber 48 for the electrical plug connectors 46 exhibits mounting means 50, which affix the electrical plug connectors 46.

In an additional favorable embodiment corresponding to FIG. 1, the heating coils 38 to the electrical plug connectors 46 are guided at least partially parallel to the respective individual line 6 on the upper side of the individual lines 6 and are enclosed in a collar 54.

In particular, the individual lines 6 are manufactured of non-filled polyamide, and can compensate for an increased internal pressure, which can form upon freezing of a liquid within the line.

For the following description it is to be noted that the invention is not restricted to the design examples and therefore not to all or multiple features of the described feature combinations; furthermore, every individual partial feature of each and every design example is also meaningful for the object of the invention separately from all other partial features described in combination, and also in combination with any features of another design example.

The invention is not limited to the depicted and described exemplary embodiments, but rather encompasses all designs of equivalent function in the sense of the invention. It is explicitly noted that the exemplary embodiments are not limited to all individual features in combination, but rather each individual feature can be meaningful to the invention independently of all other individual features. Furthermore, the invention has hitherto not been restricted to the combination of features as described in claim 1, but rather can also be defined by any other desired combination of features out of all of the features described in total. This means that in essence practically every individual feature of claim 1 can be omitted or replaced by at least one other feature described elsewhere in this application.

The invention claimed is:

1. A connector arrangement for conducting liquid urea solutions, comprising: a distributor with at least three connecting elements and a connecting component located between the connecting elements, inner channels running within the connecting component, and three individual lines, wherein the individual lines exhibit connecting means, and the individual lines being connected to the connecting elements of the distributor by the connecting means, and a housing surrounding the distributor and at least a part of the individual lines, wherein the distributor being disposed in the housing together with end sections of the individual lines, wherein a channel line inner diameter of the inner channels of the connecting component and a total length of the inner channels of the connecting component and a wall thickness of the distributor in the connecting component are dimensioned such that ice pressure on the distributor which occurs as a result of the freezing of a liquid within the distributor does not result in any destruction, wherein one of the connecting elements is a cylindrical sleeve, into which one of the individual lines is inserted and two of the connecting elements are plug connections which are each respectively inserted into insertion sleeves of the two other individual lines, wherein the inner channels of the connecting component extend all the way to a connection-side end of the plug connections and end at a transition from the connecting component to the cylindrical sleeve.

2. The connector arrangement according to claim 1, wherein the total length ($l_g$) of the inner channels of the connecting component divided by the channel line inner diameter (d) of the connecting component of the distributor is less than or equal to 9 in the following formula:

$$\text{Total length } (l_g) \text{ of inner channels} \div \text{Channel line inner diameter } (d) \leq 9.$$

3. The connector arrangement according to claim 1, wherein the connecting component of the distributor exhibits a channel line inner diameter (d) which is less than or equal to a minimal connection line inner diameter (D) of a connected individual line.

4. The connector arrangement according to claim 1, wherein the wall thickness (t) of the distributor circumferentially corresponds at least to a smallest one of the channel line inner diameters (d).

5. The connector arrangement according to claim 1, wherein the plug connections exhibit sealing areas, and the sealing areas have circumferentially disposed sealing means which exhibit a sealing means outer diameter ($d_m$), wherein the sealing means outer diameter ($d_m$) at a connecting point between the insertion sleeve and the plug connection divided by the channel line inner diameter (d) is less than or equal to 6 according to the following formula:

$$\text{Sealing means outer diameter } (d_m) \div \text{Channel line inner diameter } (d) \leq 6.$$

6. The connector arrangement according to claim 1, wherein the insertion sleeves contain an orifice reducing the connection line inner diameter down to the channel line inner diameter of the connecting component of the distributor.

7. The connector arrangement according to claim 1, wherein the insertion sleeves are connected to the individual lines in a materially-bonded manner.

8. The connector arrangement according to claim 1, wherein the distributor is circumferentially wrapped with at least one heating coil configured to electrically heat the distributor.

9. The connector arrangement according to claim 1, wherein the housing exhibits retaining means for the distributor and the connecting means, wherein at least a part of the retaining means for the connecting means in the housing is configured in a C-shape, and the connecting means are fastened in a snap-in manner, and a further part of the retaining means for the distributor is a stop tab for the distributor, wherein the stop tab is positioned at an angle of 45° to the connecting elements of the distributor, and against which the distributor rests with a stop tab which is disposed in a corresponding manner to the stop tab of the housing.

10. The connector arrangement according to claim 1, wherein the individual lines are made of non-filled polyamide.

11. The connector arrangement according to claim 1, wherein the total length ($l_g$) of the inner channels of the connecting component divided by the channel line inner diameter (d) of the connecting component of the distributor is less than or equal to 23 in the following formula:

Total length ($l_g$) of inner channel÷Channel line inner diameter (d)≤23.

12. The connector arrangement according to claim 1, wherein tab-like rotational locks and guide webs, which engage with corresponding grooves on the distributor and with guide grooves on the housing, protrude on one outer wall of the insertion sleeves of the individual lines.

13. The connector arrangement according to claim 12, wherein the tab-like rotational locks are disposed on the outer wall of the insertion sleeves at an offset of 90° and the corresponding grooves are also offset at 90° on the distributor, and the guide webs and the guide grooves in the housing are always oriented in the direction of an insertion direction.

14. The connector arrangement according to claim 1, wherein the insertion sleeves are provided with at least one heating coil on at least one side for electrically heating the insertion sleeves.

15. The connector arrangement according to claim 14, wherein the distributor and/or the insertion sleeves exhibit integrated guides and holders for the heating element coils.

16. The connector arrangement according to claim 15, wherein the housing exhibits pocket-like indentations for receiving the distributor with its associated guides and holders.

17. The connector arrangement according to claim 1, wherein the housing is divided into an upper housing half and a lower housing half.

18. The connector arrangement according to claim 17, wherein the housing halves are connected in a separable and reconnectable manner via snap-in connections.

19. The connector arrangement according to claim 1, wherein the individual lines are wrapped with at least two heating coils for electrically heating the individual lines.

20. The connector arrangement according to claim 19, wherein the individual lines exhibit a protective covering, which encloses the individual lines and the heating coils, wherein the protective covering is a shaft tube.

21. The connector arrangement according to claim 20, wherein the heating coils of the individual lines are connected to each other within the housing by electrical plug connectors.

22. The connector arrangement according to claim 21, wherein the heating coils to the electrical plug connectors are guided at least partially parallel to the respective individual line on an upper side of the individual lines and are enclosed in a collar.

23. The connector arrangement according to claim 21, wherein the housing exhibits receiving chambers for the electrical plug connectors, the electrical plug connectors being enclosed by the receiving chamber of the housing.

24. The connector arrangement according to claim 23, wherein the receiving chambers for the electrical plug connectors exhibit mounting means for the electrical plug connectors.

25. A connector arrangement for conducting liquid urea solutions, comprising: a distributor with at least three connecting elements and a connecting component located between the connecting elements, inner channels running within the connecting component, and three individual lines, wherein the individual lines exhibit connecting means, and the individual lines being connected to the connecting elements of the distributor by the connecting means, and a housing surrounding the distributor and at least a part of the individual lines, wherein the distributor being disposed in the housing together with end sections of the individual lines, wherein a channel line inner diameter of the inner channels of the connecting component and a total length of the inner channels of the connecting component and a wall thickness of the distributor in the connecting component are dimensioned such that ice pressure on the distributor which occurs as a result of the freezing of a liquid within the distributor does not result in any destruction, wherein the total length ($l_g$) of the inner channels of the connecting component divided by the channel line inner diameter (d) of the connecting component of the distributor is less than or equal to 23 in the following formula:

Total length ($l_g$) of inner channels÷Channel line inner diameter (d)≤23.

26. The connector arrangement according to claim 25, wherein the connecting elements are cylindrical sleeves, into each of which one of the individual lines is respectively inserted, wherein the inner channels of the connecting component extend all the way to transitions from the connecting component to the cylindrical sleeves.

27. The connector arrangement according to claim 25, wherein at least one of the individual lines is connected in a materially-bonded manner with one of the cylindrical sleeves of the distributor.

28. The connector arrangement according to claim 27, wherein the individual lines are connected to the cylindrical sleeves and/or the individual lines are connected to the insertion sleeves by laser welding, wherein the cylindrical sleeve and/or the insertion sleeves are at least partially made of laser-transparent plastic.

* * * * *